July 11, 1961  R. F. RUTZ  2,992,337
MULTIPLE COLLECTOR TRANSISTORS AND CIRCUITS THEREFOR
Filed May 20, 1955  3 Sheets-Sheet 1
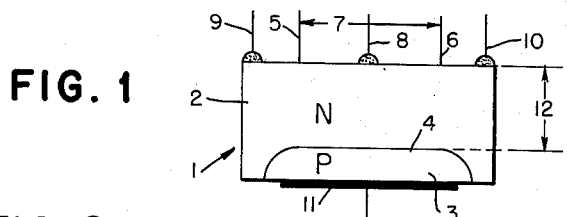
FIG. 1
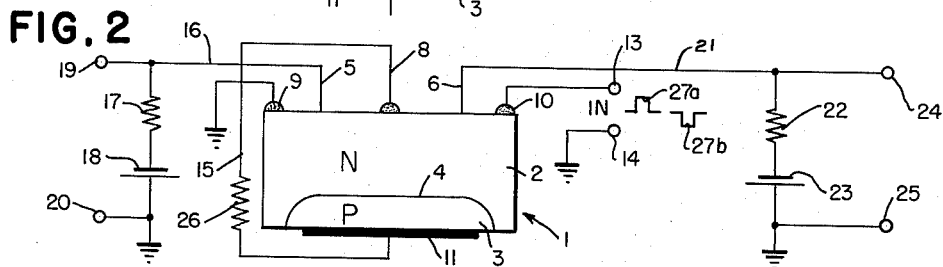
FIG. 2
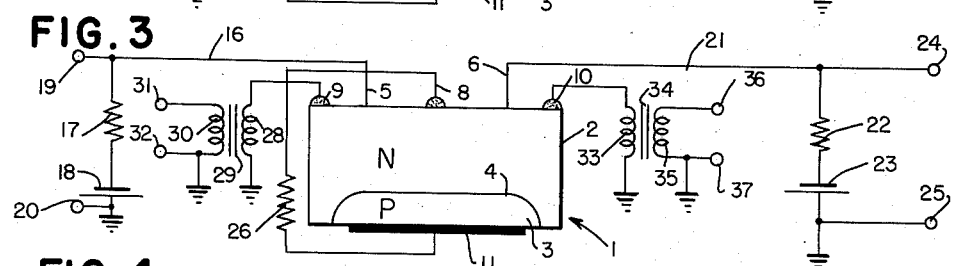
FIG. 3
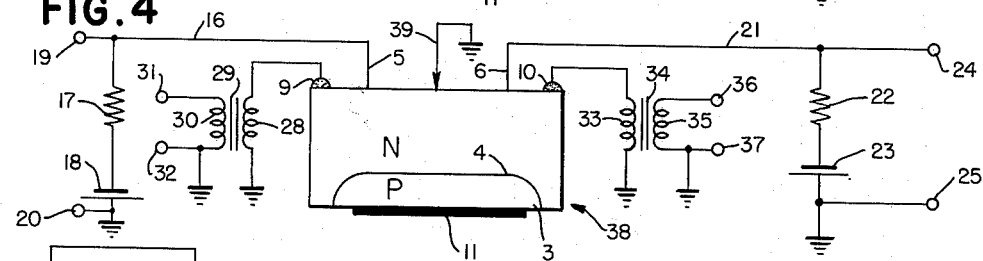
FIG. 4
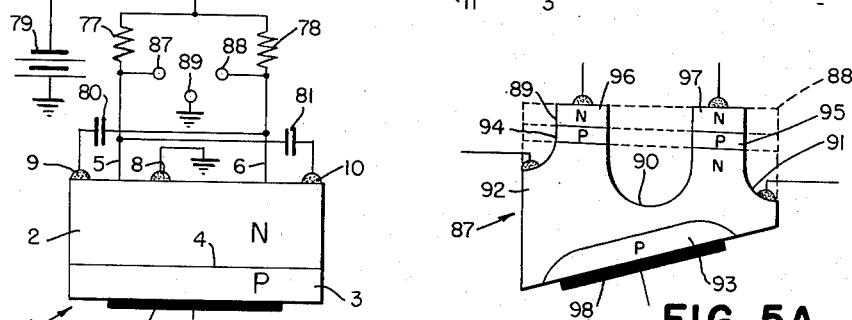
FIG. 5  FIG. 5A
INVENTOR.
RICHARD F. RUTZ
BY
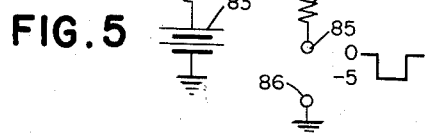
ATTORNEY July 11, 1961   R. F. RUTZ   2,992,337
MULTIPLE COLLECTOR TRANSISTORS AND CIRCUITS THEREFOR
Filed May 20, 1955   3 Sheets-Sheet 2
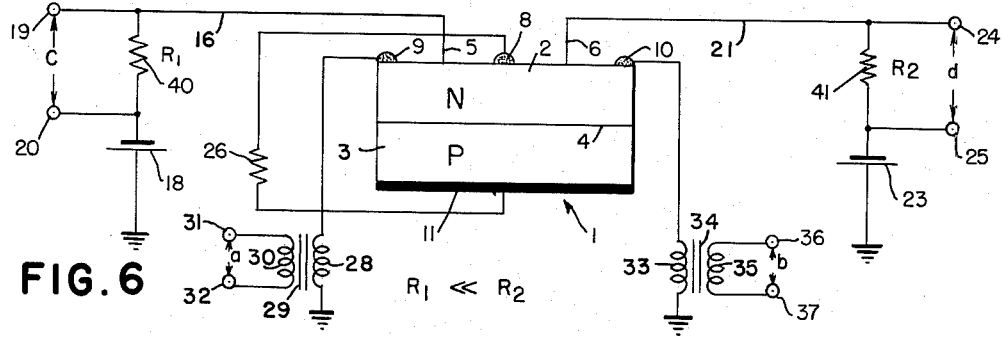
FIG. 6   $R_1 \ll R_2$
FIG. 7
| a | b | c | d |
|---|---|---|---|
| 0 | 0 | OFF | OFF |
| 1 | 0 | OFF | ON |
| 0 | 1 | ON | OFF |
| 1 | 1 | OFF | OFF |
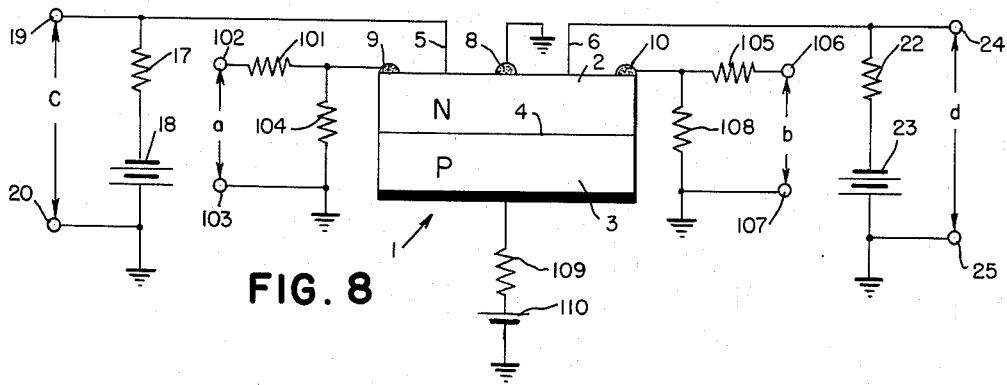
FIG. 8
FIG. 9
| a | b | c | d |
|---|---|---|---|
| 0 | 0 | ON | OFF |
| 1 | 0 | OFF | ON |
| 0 | 1 | ON | OFF |
| 1 | 1 | ON | OFF |
FIG. 10
| a | b | c | d |
|---|---|---|---|
| 0 | 0 | ON | OFF |
| 1 | 0 | OFF | ON |
| 0 | 1 | ON | OFF |
| 1 | 1 | OFF | OFF |
INVENTOR.
RICHARD F. RUTZ
BY
ATTORNEY July 11, 1961 R. F. RUTZ 2,992,337
MULTIPLE COLLECTOR TRANSISTORS AND CIRCUITS THEREFOR
Filed May 20, 1955 3 Sheets-Sheet 3
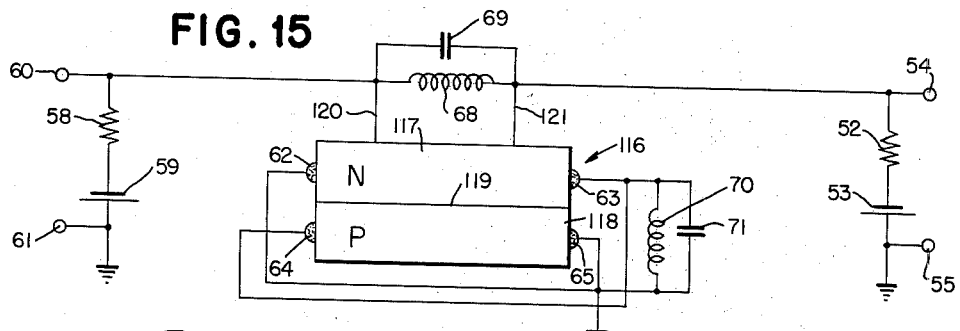
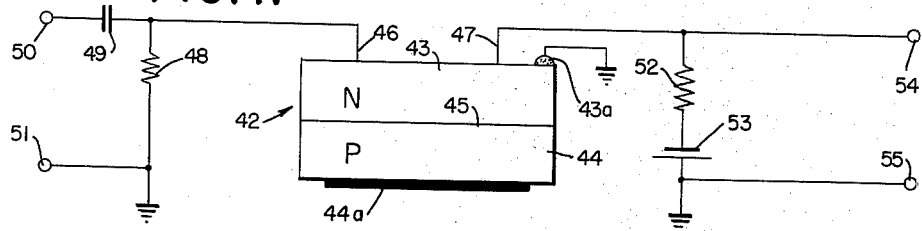
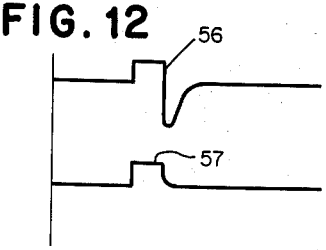
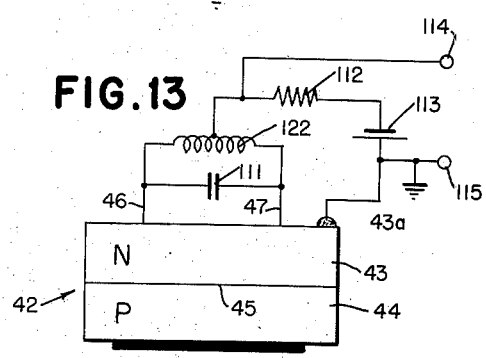
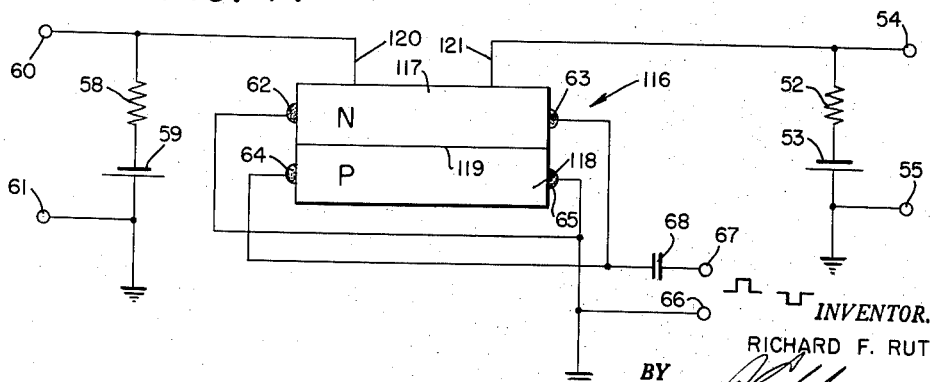
INVENTOR.
RICHARD F. RUTZ
BY
ATTORNEY United States Patent Office 2,992,337
Patented July 11, 1961

2,992,337
MULTIPLE COLLECTOR TRANSISTORS AND
CIRCUITS THEREFOR
Richard F. Rutz, Fishkill, N.Y., assignor to International
Business Machines Corporation, New York, N.Y., a
corporation of New York
Filed May 20, 1955, Ser. No. 509,852
17 Claims. (Cl. 307—88.5)

This invention relates to multiple collector transistors and circuits therefor. It is particularly concerned with transistors of the general type disclosed in my copending application Serial No. 458,619, filed September 27, 1954, entitled "Transistor Circuit Element," now Patent No. 2,889,499, granted June 2, 1959. The present application is a continuation-in-part of said copending application.

There are shown and described in said copending application transistors comprising a body of semi-conductive material including two thin regions of substantially equal area and of opposite conductivity types, the two regions being separated by a boundary junction. One of the two regions has a thickness substantially no greater than the diffusion length for the average lifetime of minority carriers in the material of that region. The second region has a resistivity substantially lower than (e.g. approximately equal to one-tenth) that of the first region and is sufficiently thin so that when provided with an ohmic electrical connection over most of its area, there is substantially no potential gradient throughout it. A high alpha collector is connected to the first-mentioned zone at the surface thereof on the opposite side from the junction. The junction, or part of it, serves as an emitter for minority carriers travelling toward the collector. The flow of minority carriers from the junction is controlled by an electric field impressed across the higher resistivity region and effective to produce a potential gradient therein which determines how great a proportion of the junction is forwardly biased so as to emit minority carriers.

In accordance with the present invention, the transistors of my copending application are modified by the addition of a second collector on the same side of the high resistivity region as the first collector. The distribution of current flow between the two collectors is determined by an electric field impressed across the region of higher resistivity. According to a modification of the present invention, both regions may be made to have substantial resistivity and potential gradients may be produced in one or both of the two semi-conductive regions.

A transistor of the type just described, having two collectors, is useful in the construction of many different types of circuits, including amplifiers and bistable circuits. Among the bistable circuits may be mentioned triggers, latches, logical circuits and oscillators.

An object of the present invention is to provide a transistor having two collectors, and improved means for controlling the distribution of current between the two collectors.

Another object is to provide improved circuits employing transistors of the type described.

A further object is to provide an improved amplifier employing a transistor of the type described.

Another object is to provide improved bistable circuits, including triggers, latches, logical circuits and oscillators, employing transistors of the type described.

The foregoing objects are attained in the structures described herein by providing a transistor comprising a body of semi-conductive material including two regions of substantially equal area and opposite conductivity types separated by a boundary junction. A first one of the regions has a resistivity substantially higher than the other and a thickness substantially no greater than the diffusion length for the average lifetime of minority carriers in the material of that region. The two collectors are in electrical contact with that first region on the surface thereof opposite the junction, and are spaced apart by a distance substantially greater than the diffusion length. The boundary junction serves as an emitter for the two collectors. The low resistivity region operates substantially at a fixed potential throughout its area. The emission of minority carriers from the junction is controlled by controlling the potential gradient across the first region, thereby determining the polarity and magnitude of the bias across the respective portions of the junction opposite the respective collectors.

In certain of the modifications shown herein, the potential gradient in the high resistivity region is controlled by the potentials of the collectors themselves. In other modifications, additional contacts to the high resistivity region are provided for controlling the potential gradient across it. These additional contacts are useful as signal input connections. In some modifications, potential gradients are established across both of the two regions of the transistor. In other modifications, the low resistivity region is connected to a fixed point in the high resistivity region. In still other modifications, the low resistivity region is left floating.

Other objects and advantages of the invention will become apparent from a consideration of the following specification and claims taken together with the accompanying drawings.

In the drawings:

FIG. 1 is a somewhat diagrammatic illustration of a transistor embodying the invention;

FIG. 2 is an electrical wiring diagram of a bistable trigger including the transistor of FIG. 1;

FIGS. 3 and 4 are wiring diagrams of bistable latch circuits employing the transistor of FIG. 1;

FIG. 5 is a wiring diagram of a trigger employing the transistor of FIG. 1;

FIG. 5A is a diagrammatic illustration of a modified form of transistor which may be used in the circuit of FIG. 5;

FIG. 6 is an electrical wiring diagram of a non-commutative logical circuit employing the transistor of FIG. 1;

FIG. 7 is a table illustrating the various logical signal input and output conditions in the circuit of FIG. 6;

FIG. 8 is a wiring diagram of another non-commutative logical circuit employing the transistor of FIG. 1;

FIGS. 9 and 10 are tables similar to FIG. 7, illustrating two different modes of operation of the circuit of FIG. 8;

FIG. 11 is an electrical wiring diagram of an amplifier utilizing one of the transistors of FIG. 1, in which not all of the electrical connections to the transistor are used;

FIG. 12 is a graphical illustration of the operation of the circuit of FIG. 11;

FIG. 13 is a wiring diagram of an oscillator circuit employing the transistor of FIG. 11;

FIG. 14 is a wiring diagram of a trigger circuit employing a modified form of transistor constructed in accordance with the invention; and FIG. 15 is a wiring diagram of an oscillator circuit utilizing the transistor of FIG. 14.

FIG. 1

There is shown in this figure a transistor generally indicated by the reference numeral 1 and including a semi-conductive body comprising a region 2 of N type semi-conductive material and a region 3 of P type semi-conductive material. These regions are separated by a boundary junction 4. Two collectors 5 and 6 engage the surface of the N region 2 opposite the junction 4. The collectors 5 and 6 are separated by a distance 7 which is greater than the diffusion length for the average lifetime of minority carriers in the N region 2. The thickness 12 of the N region 2 between the surface engaged by the collectors 5 and 6 and the junction 4 must be substantially equal to or less than that diffusion length.

The resistivity of N region 2 should be sufficiently greater than that of P region 3 to ensure efficient emission of minority carriers from junction 4. For example, a resistivity of N region 2 equal to ten times the resistivity of P region 3 is considered suitable for the modification described herein, unless otherwise specified. More specifically, a resistivity of 5 ohm-cm. may be used for region 2 and a resistivity of 0.5 ohm-cm. for region 3.

It will be readily understood that the order of the types of the semi-conductive materials may be reversed, i.e. region 2 may be made P type and region 3 N type. If so reversed, the same dimensional and resistivity limitations apply as described above. That is to say, the diffusion length of minority carriers in region 2 always determines the dimensional limitations and region 2 always has a greater resistivity than region 3.

The collectors 5 and 6 may be electro-formed point contacts, or may be any other collector structure having an intrinsic current amplification greater than 1 and (for N type material) preferably greater than $1+b$, where $b$ = the mobility ratio of electrons and holes in the region 2. For P type material, the intrinsic current amplification is preferably greater than $$1+\frac{1}{b}$$

An ohmic electrical connection 8 is made to the upper surface of the N region 2 between the collectors 5 and 6 and additional ohmic connections 9 and 10 are made to the upper surface of N region 2 at its opposite ends. A broad ohmic electrical connection 11 extends over substantially the entire lower surface of the P region 3. The resistivity of region 3 is low enough and that region is made thin enough so that, with the aid of the broad connection 11, the P region is operated as an equipotential region.

*FIG. 2*

This figure illustrates the transistor of FIG. 1 connected in a bistable circuit which operates as a trigger. Those elements in FIG. 2 which correspond to their counterparts in FIG. 1 have been given the same reference numerals and will not be further described.

The ohmic connection 9 is grounded. The connection 10 is connected to an input terminal 13, and another input terminal 14 is grounded. The ohmic connection 8 is connected through a wire 15 and resistor 26 to the ohmic connection 11. Collector 5 is connected through a wire 16, a load resistor 17, and a load supply battery 18 to ground. Output terminals 19 and 20 are respectively connected to the collector 5 and to ground.

Collector 6 is connected through a wire 21, a load resistor 22 and a load supply battery 23 to ground. Output terminals 24 and 25 are respectively connected to the collector 6 and to ground.

*Operation of FIG. 2*

Consider the potential gradient across the N region 2 and the bias potential created by that gradient across different portions of junction 4. The potentials of the collectors 5 and 6 may be neglected, insofar as they may affect this potential gradient, since the potential gradients produced by the potentials of the batteries 18 and 23 are for the most part concentrated at the reversely biased collector structures, and have relatively little effect on the potential gradient within the region 2, as long as other potentials are present to control that gradient.

The connection 9 is grounded, while the connection 10 is connected to an input terminal 13 which may receive either a positive signal indicated graphically at 27a or a negative signal indicated graphically at 27b.

Assume that a positive signal is received at input terminal 13. An even potential gradient is thus established across the N region 2 with the right-hand end positive. The central portion of the N region which is at a median potential is connected through wire 15 to the P region 3, so that the entire P region is substantially at that median potential. The right-hand half of the junction 4 is then reversely biased, since the P region 3 is at a less positive potential than the potential above the junction 4. On the other hand, the left-hand half of the junction 4 is forwardly biased, since the N region 2 above it is at a less positive potential than the P region 3 below it. The left-hand half of the junction may therefore serve as an emitter of holes into the N region 2. These holes are collected at the collector 5 and a large output current pulse is produced, appearing as a signal at the output terminals 19 and 20.

When current starts flowing through collector 5, the potential gradient produced by the current in N region 2 may tend to increase the forward potential across the left-hand portion of junction 4, thereby increasing the supply of holes. The resistor 26 effectively limits the hole supply, preventing the action from being cumulative beyond a definite point, and improving the switching speed.

If for any reason it is desired not to limit this cumulative action in any particular instance, resistor 26 may be omitted.

After the positive input signal 26 terminates, both terminals 9 and 10 are at ground potential, and the potential difference across the junction 4 becomes very small. If the junction 4 continues to emit holes, that emission is accompanied by a potential drop across resistor 26, so that region 3 becomes momentarily negative with respect to region 2, junction 4 becomes reversely biased, and the emission stops, turning the transistor Off.

Now assume that a negative signal 27 is supplied between the input terminals 13 and 14. The operation is analogous to that just described, except that the right-hand half of the junction 4 is forwardly biased and the left-hand half is reversely biased so that a substantial output current flows through collector 6 and an output signal appears at terminals 24 and 25. The circuit of FIG. 2 serves as a discriminator between positive and negative signals at the input. Where the signals alternate in polarity with no intervening period of zero potential, the circuit operates as a latch with complementary outputs.

*FIG. 3*

This figure illustrates a modification of the circuit of FIG. 2, in which somewhat different input arrangements are provided. This circuit may be operated either as a trigger or as a latch circuit. Those circuit elements in FIG. 3 which correspond to their counterparts in FIG. 2 have been given the same reference numerals and will not be described in detail.

In FIG. 3 the ohmic connection 9 is connected to ground through the secondary winding 28 of an input transformer 29. The primary winding 30 of input transformer 29 is connected to input terminals 31 and 32, one of which is grounded.

Ohmic connection 10 is similarly connected to the secondary winding 33 of an input transformer 34 having a primary winding 35. One terminal of each of the windings 32 and 35 is grounded. Primary winding 35 is connected to input terminals 36 and 37.

*Operation of FIG. 3*

In FIG. 3, input signals of either polarity may be supplied to either of the two sets of input terminals. An output pulse at the left-hand output terminals 19 and 20 may be switched On either by a positive input pulse supplied to terminals 36 and 37, or a negative input pulse at terminals 31 and 32. The output pulse at terminals 19 and 20 may be switched Off and an output pulse initiated at the terminals 24 and 25, either by a negative input pulse at the terminals 36 and 37 or by a positive input pulse at the terminals 31 and 32.

When the circuit is operated by input pulses to alternately opposite polarities at a single set of input terminals, it may be termed a trigger circuit. If it is operated by signals of the same polarity alternately at the two sets of input terminals, it is termed a latch circuit.

FIG. 4

This figure illustrates a bistable circuit generally similar to the circuit of FIG. 3, except that the transistor 1 is replaced by a transistor 38 which differs from the transistor 1 in that the ohmic connection 8 is replaced by a point contact emitter 39 located midway between the collectors 5 and 6. In this modification, the P region 3 of the transistor is left floating, i.e. without any external electrical connection, except for the broad ohmic contact 11. The other parts of the transistor and the other elements in the circuit correspond fully to their counterparts in the preceding figures, and have been given the same reference numerals.

The operation of the circuit of FIG. 4 is analogous to that of the circuit of FIG. 3. Holes from the emitter 39 diffuse to and collect in the P region 3 and are re-emitted from that region to go to collectors 5 and 6, depending upon which of the two collectors is favored by the distribution of the potential gradient impressed between the ohmic connections 9 and 10.

The modifications employed in FIG. 4, as compared to FIG. 3, could also be employed in the circuit of FIG. 2.

FIG. 5

This figure illustrates a trigger utilizing the transistor 1 of FIG. 1. In FIG. 5, the collectors 5 and 6 are connected through load resistors 77 and 78, respectively, to the negative terminal of a load supply battery 79. Collector 6 is connected through a capacitor 80 to the ohmic connection 9. Collector 5 is connected through a capacitor 81 to the ohmic connection 10. The broad ohmic connection 11 of the P region 3 is connected through a resistor 82 and a biasing battery 83 to ground. Ohmic connection 11 is also connected through a resistor 84 to an input terminal 85. The opposite input terminal 86 is grounded. Complementary output terminals 87 and 88 are connected to collectors 5 and 6, respectively. A third output terminal 89 is grounded.

Operation of FIG. 5

It will be recognized that in the construction of a transistor such as transistor 1, the collectors 5 and 6 will not have exactly equal impedances and their locations will not be exactly equal with respect to their spacing from the ohmic connection 8 and from the junction 4. In the circuits described above, minor differences in the collectors 5 and 6, of the type now under consideration, do not affect the operation of the circuits. In the present circuit, it is essential that such minor differences exist, so that holes emitted from the junction 4, all other conditions being equal, will normally tend to diffuse more readily to one of the collectors than to the other. Such an unbalance of the collectors may be readily introduced intentionally in the manufacture of the transistor, by a number of difference expedients, such as positioning the ohmic connection 8 closer to one collector than to the other.

Starting with no input signal at the terminals 85, 86, notice that the P region 3 is biased positively by the battery 83, so that the junction 4 is biased forwardly and tends to emit holes. As pointed out above, one of the two collectors 5 and 6 is favored, and the holes tend to flow to that collector, producing a current flow through its associated resistor. For the purposes of the present discussion, let it be assumed that the collector 5 is favored, and that the current flows through resistor 77 and battery 79. Besides the hole current from junction 4, this current includes a substantial electron current flow from collector 5 to grounded base 8. This electron current flow produces a potential gradient in N region 2, which attracts still more holes to collector 5. The effect is cumulative, so that the collector 5 is latched On, and collector 6 is Off.

Input terminal 85 shifts between a no signal potential of 0 volts and a negative signal potential having a value great enough to overcome the positive bias potential from battery 83. When the next input signal is received, it overcomes the forward bias supplied by battery 85 and reverse biases the junction 4, thereby cutting the transistor Off. This effectively terminates the flow of current through collector 5. The cutting off of the current flow through collector 5 transmits a negative going signal through capacitor 81 to ohmic connection 10. The time constant of the cross-feedback connection which includes capacitor 81 must be greater than the length of the input pulse, so that after the negative signal terminates at input terminal 85, the negative going signal at terminal 10 still persists. Consequently, when the potential of input terminal 85 returns to zero, and the positive bias of battery 83 again becomes effective to bias the junction 4 forwardly, the region in the neighborhood of collector 6 and ohmic connection 10 is more negative than the region in the neighborhood of collector 5 and ohmic connection 9, so that collector 6 overcomes the normal favoring of collector 5 and attracts a predominant number of holes from junction 4. When collector 6 starts to conduct the effect becomes cumulative, the electron current flow from collector 6 to ohmic connection 8 being effective to set up a potential gradient in the region 2 which attracts a still greater proportion of the holes from region 3 to the collector 6. Collector 6 and resistor 78 and output terminal 88 therefore switch On when the input signal terminates. Collector 6 and output terminal 88 remain On until the next input signal is received, whereupon they switch Off. In going Off, a negative going cross-feedback pulse is transmitted through capacitor 80 to ohmic connection 9. As before, this pulse holds over until the beginning of the following signal and is then effective to make the holes move toward the favored collector 5 rather than the other collector 6.

It may therefore be seen that the circuit of FIG. 5 operates as a trigger having complementary outputs, and that it switches back and forth between its two stable conditions in response to successive input signals of the same polarity.

FIG. 5A

This figure shows an alternative form of transistor structure which may be utilized in place of the transistor 1 in the circuit of FIG. 5.

The transistor of FIG. 5A is generally indicated by the reference numeral 87. It is originally formed as a block 88 of NPN junction material having the outlines shown in dotted lines. The upper surface of the transistor is then etched or ground away to provide three recesses 89, 90 and 91 which extend through the upper N and P regions into the main N region 92. The lower side of the N region 92 is then ground away with a beveled contour, and a P region 93 is diffused into it. Because of the beveled contour, the P region 93 is not symmetrically spaced with regard to the two opposite P regions 94 and 95. Each of the P regions 94 and 95 with its associated N region, respectively shown at 96 and 97, forms a PN hook collector, which is a well known type of collector structure having high intrinsic current amplification. The lack of symmetry between the P region 93 and the two PN hook collectors provides the favoring of one collector which is essential in the operation of the circuit of FIG. 5.

A broad ohmic contact 98 is applied over the face of the P region 93, and serves the function of the ohmic connection 11 of FIG. 5.

FIGS. 6 and 7

The circuit illustrated in FIG. 6 is a non-commutative logical circuit based on the bistable latch circuit of FIG. 3. The circuit of FIG. 6 is similar to that of FIG. 3, except that the load resistors 17 and 22 of FIG. 3 are replaced by the load resistors 40 and 41, respectively. The relative values of these load resistors are selected so that collector 5 or 6, whichever has the greater intrinsic current amplification, normally operates in the saturation region. The normal condition of the output terminals 19 and 20 is their Off of non-signal producing condition.

The input signals at terminals 31 and 32 are indicated in the table of FIG. 7 by the reference character $a$. The input signals at terminals 36 and 37 are indicated by the reference character $b$. Output signals at terminals 19 and 20 are indicated by the reference character $c$, and output signals at the terminals 24 and 25 are indicated by the reference character $d$.

The table of FIG. 7 shows the various combinations of input signals $a$ and $b$ and the resulting combinations of output signals $c$ and $d$. It may be seen that there are only two combinations of signals at input terminals $a$ and $b$ which can shift the output signals from their normal condition with the signal $c$ off and the signal $d$ off. These particular combinations of input signals are with the signal $a$ at its binary 1 value (positive) and the signal $b$ at its binary 0 value, and the converse.

A binary 1 input signal may correspond, for example, to an input potential of +5 volts, while a binary 0 corresponds to an input potential of 0 volts. When the input signals are in the conditions illustrated in the second line of the table, the connection 9 is substantially at +5 volts and the connection 10 is at ground potential. The left-hand half of the junction 4 is then reverse biased, and collector 5 is Off. If both of these two signal potentials shift from these values to their opposite values, as in line 3 of FIG. 6, then the collector 5 is turned On. As long as both input signals are the same at any value, then they counteract each other and do not disturb the normal condition of the output signals.

It may therefore be seen that the circuit of FIG. 6 operates as a non-commutative logical circuit, in that only one of the possible combinations of input signals will operate to shift a given collector from its normal output condition to a different output condition. The circuit therefore logically distinguishes that one particular combination of input signals from all other possible combinations.

FIGS. 8 to 10

FIG. 8 illustrates a non-commutative logical circuit using the same transistor 1 as the circuit of FIG. 3, but operating in a somewhat different manner. The input signals are resistively coupled to the transistor in the circuit of FIG. 8 instead of being conductively coupled as in the circuit of FIG. 6. Furthermore, the junction 4 is permanently biased forwardly. Those circuit elements of FIG. 8 which are the same as those in the preceding figures have been given the same reference numerals and will not be further described. Note that the load resistors 17 and 22 are equal, corresponding to those of FIG. 4, rather than to the resistors 40 and 41 of FIG. 6, which may be unequal.

Ohmic connection 9 is connected through a resistor 101 to an input terminal 102. Another input terminal 103 is grounded. Connection 9 is also connected through a resistor 104 to ground. Ohmic connection 10 is connected through a resistor 105 to an input terminal 106. Cooperating input terminal 107 is grounded. Connection 10 is also connected through a resistor 108 to ground. Ohmic connection 11 is connected through a resistor 109 and a biasing battery 110 to ground. Ohmic connection 8 is directly connected to ground.

Operation of FIG. 8

As in the case of the circuit of FIG. 6, it is assumed that a binary 1 input signal corresponds to an input potential of +5 volts and that a binary 0 input signal corresponds to an input potential of 0 volts. As in the case of the circuit of FIG. 5, it is essential that the transistor 1 be constructed so that one of the collectors is favored over the other. The transistor 87 of FIG. 5A may therefore be used in place of transistor 1. Consequently, since the junction 4 is biased forwardly by battery 110, then if there is no input signal at either of the sets of input terminals 102, 103 or 106, 107, the favored collector conducts, and sets up a potential gradient in the N region 2 which effectively reduces the number of holes reaching the other collector.

The table of FIG. 9 shows the state of the transistor 1 for various combinations of input signals, when the signal value of the input potential has a small value, for example, 5 volts. When there is no input signal at either set of input terminals, as shown in line 1 of FIG. 9, collector 5 is conducting and an output signal appears at terminals 19 and 20. Collector 6 is not conducting and no output signal appears at terminals 24 and 25. If, as in line 2 of FIG. 9, a positive signal is now received at input terminal 102, it becomes effective to reverse bias the portion of the junction 4 opposite to collector 5, thereby cutting off that collector, so that the holes emitted by junction 4 flow to collector 6, producing a signal at output terminals 24 and 25.

The combination of input signals in line 3 of FIG. 9 restores the normal condition of the output terminals. The collector 5 remains On, and a positive input signal at terminal 106 tends to hold collector 6 Off even more strongly.

When the input conditions are as indicated in the fourth line of FIG. 9, the two input signals balance one another and the conditions at the output terminals are again in their normal state as they would be if there were no input signals.

If an input signal of somewhat larger potential is used, for example 10 volts, then the table of FIG. 10 may apply instead of the table of FIG. 9. The two tables are identical except for their last line, when input signals are received at both sets of input terminals. If the input signal is sufficiently strong as compared to the biasing potential of battery 110, then that input signal may be effective to turn the collector 5 Off, so that both collectors remain Off at the same time.

Either the arrangement of FIG. 9 or the arrangement of FIG. 10 may be used as a non-commutative logical circuit. The arrangement of FIG. 9 is to be preferred, since it provides complementary outputs, either of which distinguishes one particular combination of input signals from all other possible combinations of input signals.

FIGS. 11 and 12

FIG. 11 illustrates a modified form of transistor generally indicated by the reference numeral 42. The transistor 42 includes an N region 43 and a P region 44, the two regions being separated by a boundary junction 45. The thickness of the N region 43 should be substantially equal to or less that the diffusion length for the average lifetime of minority carriers in that region. Two contacts or whiskers 46 and 47 are in electrical engagement with the surface of the N region 43 opposite the junction 45. These contacts must be so constructed that each, when biased as a collector, has high intrinsic current amplification. The spacing between these two contacts must be greater than the diffusion length. One of the two contacts normally serves as an emitter and the other as a collector when the circuit is functioning. In the specific circuit illustrated, the contact 46 is always the emitter, and is connected through a resistor 48 to ground. Contact 46 is also connected through a coupling capacitor 49 to an input terminal 50. The opposite input terminal 51 is grounded.

Collector 47 is connected through a load resistor 52 and a load supply battery 53 to ground. An output terminal 54 is connected to collector 47 and another output terminal 55 is grounded.

An ohmic base connection 43a is grounded. The region 44 is of material having a substantially lower resistivity than the material of region 43, being similar to region 3 of FIG. 1 in this respect. Also, region 44 is provided with a wide area ohmic contact 44a, and is thin enough so that it operates as a substantially equipotential region.

The circuit of FIG. 11 is a bistable amplifier intended particularly for use with square-wave input signals such as illustrated graphically at 56, having a positive half-wave immediately followed by a negative half-wave. The floating P region 44 tends to assume a potential intermediate between that of the emitter 46 and ground. The positive half-wave biases the right-hand half of junction 45 forwardly. Emitter 46 then emits minority carriers to the left-hand half of the junction 45 where they pass into the P region, and are re-emitted through the right-hand half of junction 45 to collector 47. When the positive half of the input signal terminates, and the input swings negative, the emitter 46 momentarily becomes a collector and competes with the collector 47 to clean up the holes remaining in the neighborhood of collector 47, through the interaction of the floating P region 44. By suddenly eliminating these minority carriers from the vicinity of the collector 47, the output signal terminates quickly, the fall time being reduced substantially to zero. The output signal is indicated graphically at 57 in FIG. 12. FIG. 12 shows the input and output signals 56 and 57 in their proper relation with respect to time.

FIG. 13

This figure illustrates an oscillator circuit employing the transistor 42 described in connection with FIG. 11. In FIG. 13 there is connected between the electrodes 46 and 47 a resonant circuit comprising an inductance coil 122 and a parallel capacitor 111. A load circuit branch including a resistor 112 and a battery 113 in series is connected between a center tap on the coil 122 and the ohmic connection 43a. Output terminals 114 and 115 are respectively connected to the center tap and to the connection 43a.

The operation of the circuit of FIG. 13 should be readily understood. As the resonant circuit oscillates at its resonant frequency, the electrodes 46 and 47 respectively and alternately serve as emitter and collector. The P region 44 floats at a potential substantially half-way between the alternate positive and negative maximum potentials of the collectors 46 and 47. During the half cycle, one half of the junction 45 is biased forwardly and the other half is biased negatively. The forwardly biased half is emitting holes toward the one of the two electrodes 46, 47 which is acting as a collector, and the negatively biased half is acting as a collector for holes emitted from the other one of the two collectors 46, 47 which is then acting as an emitter.

FIG. 14

This figure illustrates a trigger circuit employing a somewhat different transistor, indicated generally at 116. This transistor comprises an N region 117 separated from a P region 118 by a boundary junction 119. Two electrodes 120 and 121 having high intrinsic current amplification when biased as collectors are in electrical contact with the surface of region 117 opposite to junction 119. As in the transistors previously described, the thickness of the N region 117 is substantially no greater than the diffusion length for the average lifetime of the minority carriers in that region. The transistor 116 differs from the previous transistors, however, in that the resistivity of the P region 118 is substantially higher than in the previous structures. The resistivity of region 118 is substantially lower than that of region 117, being, for example, approximately one-half the resistivity of region 117. However, since it is desired in the transistor 116 to establish a substantial potential gradient across the P region 118, it is made with a substantially higher resistivity. This reduces the emitting efficiency of the junction 119 somewhat but a compromise must be selected between the two desired ends, namely a high potential gradient across region 118 and a high emitting efficiency for the junction 119.

In FIG. 14, the transistor 116 is connected in a bistable circuit, specifically a trigger circuit. Electrode 120 is connected through a load resistor 58 and a load supply battery 59 to ground. An output terminal 60 is connected to electrode 120, and an output terminal 61 is connected to ground. Output terminal 54 is connected to electrode 121 and terminal 55 to ground. The circuit of FIG. 14 has two sets of output terminals 54, 55 and 60, 61.

Ohmic connections 62, 63 are provided at the opposite ends of the N region 43. Ohmic connections 64, 65 are provided at opposite ends of the P region 44. An input terminal 66 is connected to ground and also to the diagonally opposite ohmic connections 62 and 65. Another input terminal 67 is connected through a coupling capacitor 68 to the other two diagonally opposite ohmic connections 63 and 64.

Operation of FIG. 14

When there is no signal at the input terminals 66 and 67, then the left-hand half of junction 119 is reversely biased, since the left-hand end of N region 117 is grounded and the left-hand end of P region 118 is connected to the right-hand end of N region 117, which is biased negatively by the load supply battery 53. For similar reasons, the right-hand half of junction 119 is biased forwardly and serves as an emitter of minority carriers to the electrode 121, which serves as a collector, so that a high current flows through collector 121, and substantially no current through electrode 120.

A positive signal applied at the input terminals 66 and 67 reverses the situation described above, since the left-hand half of the junction 119 becomes forwardly biased and the right-hand half negatively biased. If the positive signal terminates, then the previous conditions are restored. They may also be restored by a negative signal appearing at terminals 66 and 67.

The bistable circuit of FIG. 14 therefore operates as a trigger swinging between a normal bistable state when the input signal is zero or negative and the opposite bistable state when a positive signal is received.

FIG. 15

This figure illustrates a modification of the circuit of FIG. 14 which is adapted to serve as an oscillator by the addition of a tuned circuit comprising an inductor coil 68 and a parallel capacitor 69 between the collectors 120 and 121, and another tuned circuit comprising a coil 70 and a capacitor 71 in place of the input terminals. The operation of the circuit is analogous to that of FIG. 14, except that the circuit oscillates by itself, without the supply of input signals.

As mentioned in connection with FIG. 1, in any of the transistors disclosed herein, the order of the types of the semi-conductive materials may be reversed, i.e. the region to which the collectors are connected may be P type and the other region N type. If so reversed, the same dimensional and resistivity limitations apply. In other words, the diffusion length for the average lifetime of minority carriers in the region to which the collectors are connected always determines the dimensional limitations such as the collector spacing and the thickness of that region. The region to which the collectors are connected also must always have a greater resistivity than the other region.

While I have shown and described certain preferred embodiments of my invention, other modifications thereof will readily occur to those skilled in the art and I therefore intend my invention to be limited only by the appended claims.

I claim:

1. A transistor comprising a body of semi-conductive material including two thin regions of opposite conductivity types, each said region being defined in part by two opposed faces, each having an extent in at least one direction substantially greater than the thickness of the region, said regions having a common interface defining one face of each region and serving as a boundary junction, one of said regions having a thickness substantially no greater than the diffusion length for the average lifetime of minority carriers in the material thereof, the other of said regions having a resistivity substantially lower than said one region, two collectors having high intrinsic current amplification in electrical contact with said one rigion on the face thereof opposite said junction, said collectors being spaced in said one direction by a distance substantially greater than said diffusion length, and means for controlling the potential gradient across at least one of said regions in said one direction to determine the polarity and magnitude of the bias across the portions of said junction opposite the respective collectors and thereby the respective rates of emission of minority carriers from said junction portions.

2. A transistor as defined in claim 1, including an electrode in electrical engagement with said one region at a point midway between said collectors.

3. A transistor as defined in claim 2, including low impedance contact means in engagement with substantially the entire face of said other region opposite said junction, said other region being thin enough so that it operates substantially at the same potential throughout, and means electrically connecting said electrode to said low impedance contact means.

4. A transistor as defined in claim 1, including low impedance contact means in engagement with substantially the entire face of said other region opposite said junction, said other region being thin enough so that it operates at substantially one potential throughout.

5. A bistable circuit including a transistor comprising a body of semi-conductive material including two thin regions of opposite conductivity types, each said region being defined in part by two opposed faces, each having an extent in at least one direction substantially greater than the thickness of the region, said regions having a common interface defining one face of each region and serving as a boundary junction, one of said regions having a thickness substantially no greater than the diffusion length for the average lifetime of minority carriers in the material thereof, the other of said regions having a resistivity substantially lower than said one region, two collectors having high intrinsic current amplification in electrical contact with said one region on the face thereof opposite said junction, said collectors being spaced in said one direction by a distance substantially gerater than said diffusion length, signal output means connected to at least one collector, and signal input means electrically connected to at least one of said regions and shiftable between signal and no-signal conditions for controlling the potential gradient across said last-mentioend one region in said one direction to determine the polarity and magnitude of the bias across said junction opposite at least said one collector, and thereby the rate of emission of minority carriers from the junction portion opposite said one collector, said signal input means being effective in one of said conditions to establish a substantial flow of minority carriers from said junction portion toward said one collector, and in the other of said conditions to reverse bias said junction portion and cut off the flow of minority carriers toward said one collector.

6. A bistable circuit as defined in claim 5, including complementary outputs connected to said two collectors, said signal input means being operable to control the potential gradient so as to determine the polarity and magnitude of the bias across the junction portions opposite said both collectors.

7. A bistable circuit as defined in claim 5, in which said one region is connected to ground at one end and said signal input means is connected to the other end.

8. A bistable circuit as defined in claim 5, in which said signal input means comprises cross-feedback means connecting each collector to the opposite end of said one region.

9. A bistable circuit as defined in claim 5, including two signal input means connected to the oposite ends of said one region, each said signal input means comprising an input transformer having a primary winding and a secondary winding, means connecting one end of said secondary winding to ground, and means connecting the opposite end of the secondary winding to one end of said one region.

10. A bistable circuit as defined in claim 9, including an ohmic connection to said one region midway between said collectors, low impedance contact means in engagement with substantially the entire face of said other region opposite said junction, said other region being thin enough so that it operates substantially at the same potential throughout, and means conductively connecting said ohmic connection to said low impedance contact means.

11. A bistable circuit as defined in claim 9, including low impedance contact means in engagement with substantially the entire face of said other region opposite said junction, said other region being thin enough so that it operates substantially at the same potential throughout, said other region being electrically connected only to said low impedance contact means and said junction, and a point contact emitter in electrical engagement with said one region at a point midway between said collectors.

12. A bistable circuit as defined in claim 5, including means directly connecting one end of said one region to ground, signal input means adapted to receive signals of opposite polarities and connected to the other end of said one region, low impedance contact means in engagement with substantially the entire face of said other region opposite said junction, said other region being thin enough so that it operates substantially at the same potential throughout, and means electrically connecting said low impedance contact means to said one region at a point between said two collectors.

13. A bistable circuit as defined in claim 5, including means biasing said junction forwardly, said signal input means being effective in said other condition to overcome said forward bias over at least a portion of said junction and terminate the emission of minority carriers therefrom.

14. A trigger comprising a transistor including a body of semi-conductive material comprising two thin regions of substantially equal area and of opposite conductivity types separated by a boundary junction, one of said regions having a thickness substantially no greater than the diffusion length for the average lifetime of minority carriers in the material thereof, the other of said regions having a resistivity substantially lower than said one region, two collectors having high intrinsic current amplification in electrical contact with said one region on the side thereof opposite said junction, said collectors being spaced by a distance substantially greater than said diffusion length, load impedance means connected to each of said collectors, complementary output means connected to said collectors, cross-feedback impedance means connected between each collector and the opposite end of said one region, an ohmic connection between ground and a point in said one region midway between said collectors, said collectors and said cross-feedback means cooperating to establish a potential gradient in said one region such that only one collector is conductive at one time, low impedance contact means in engagement with substantially the entire surface of said other region, said other region being thin enough so that it operates substantially at the same potential throughout, forward bias means connected to said low impedance contact means and tending to bias said junction forwardly to emit minority carriers therefrom toward said collectors, and signal input means connected to said load impedance means and effective at times to overcome said forward bias and cut off the flow of minority carriers from said junction.

15. A trigger as defined in claim 14, in which each said cross-feedback means has a time delay greater than the duration of an input signal, so that at the termination of each input signal the cross-feedback means is effective to apply a potential gradient to said one region in a sense to attract minority carriers to the collector which was not conducting during the previous no signal period.

16. A transistor comprising a body of semi-conductive material including two thin regions of substantially equal area and of opposite conductivity types, separated by a boundary junction, one of said regions having a thickness substantially no greater than the diffusion length for the average lifetime of minority carriers in the material thereof, the other of said regions having a resistivity substantially lower than said one region, said one region being beveled so that it is substantially thinner at one end, two PN hook collectors in electrical contact with said one region on the side thereof opposite said junction, said collectors being spaced by a distance substantially greater than said diffusion length, and means for controlling the potential gradient across at least one of said regions to determine the polarity and magnitude of the bias across the portions of said junction opposite the respective collectors and thereby the respective rates of emission of minority carriers from said junction portions, the beveled shape of said one region being effective to favor collection of said carriers at a particular one of said two collectors.

17. A semi-conductive device comprising a semiconductive body including a plurality of individual conductive paths therethrough, each consisting of four contiguous zones in succession, successive zones being of the opposite conductivity type, each of the conductive paths having common first and second zones and individual third and fourth zones, an electrical connection to the common first zone forming a common connection to the individual conductive paths, and an individual electrical connection to each of the individual fourth zones for connecting separately to each of the individual conductive paths.

References Cited in the file of this patent
UNITED STATES PATENTS

| | | |
|---|---|---|
| 2,570,978 | Pfann | Oct. 9, 1951 |
| 2,586,080 | Pfann | Feb. 19, 1952 |
| 2,597,028 | Pfann | May 20, 1952 |
| 2,623,105 | Shockley et al. | Dec. 23, 1952 |